May 6, 1958 M. S. SISULAK ET AL 2,833,410
COTTON CLASSIFYING APPARATUS
Filed Oct. 28, 1954
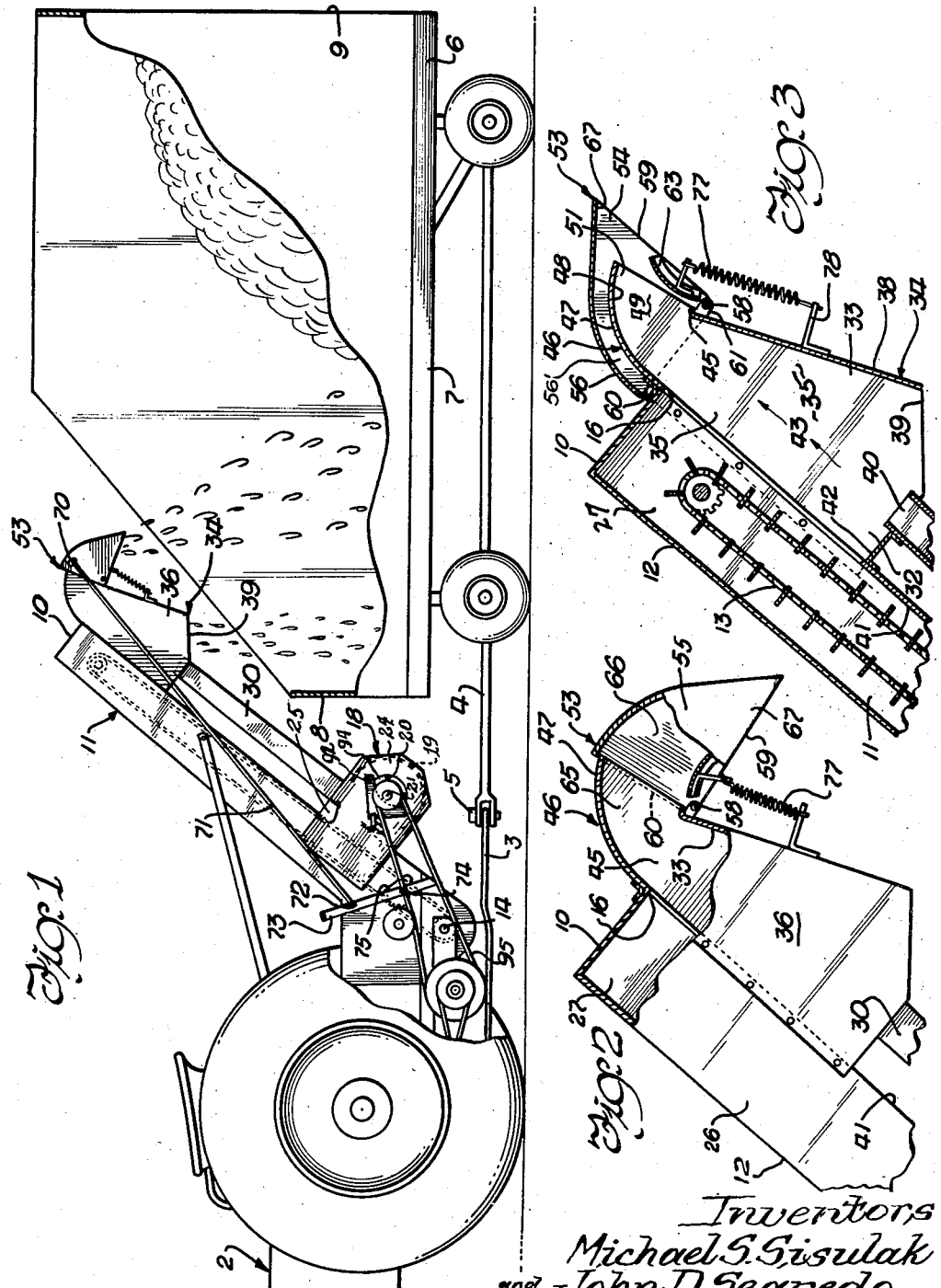
Inventors
Michael S. Sisulak
and John D. Segredo
By Paul O. Pippel
Atty.

United States Patent Office 2,833,410
Patented May 6, 1958

2,833,410

COTTON CLASSIFYING APPARATUS

Michael S. Sisulak and John D. Segredo, Chicago, Ill., assignors to International Harvester Company, a corporation of New Jersey Application October 28, 1954, Serial No. 465,413

13 Claims. (Cl. 209—137)

This invention relates to a classifying and cleaning apparatus and more specifically to a device for attachment to a cotton harvester of the type known as a cotton stripper.

A general object of the invention is to provide a crop classifier which is attachable to the underside of a cotton elevator of a conventional cotton stripper.

A more specific object of the invention is to provide a novel classifier which incorporates a deflector positioned beneath the discharge opening at the upper end of the cotton elevator, the deflector having a forwardly open end for guiding heavy bodies such as green bolls and the like to the forward end of a trailing wagon which the upper end of the elevator overhangs, the forward open end of the guide being associated with a blower which is adapted to blow an air stream through the descending aggregate from the elevator to the deflector and the blower being adapted to blow the light cotton rearwardly and upwardly into a novel hood which is pivotal to discharge the cotton to the far end of the wagon when it is empty and progressively toward the front end of the wagon as it is filled.

A further object of the invention is to provide such a novel hood structure which provides a constricted passage functioning in the manner of a venturi to provide a high air velocity in the position of the hood when the cotton is to be discharged farthest and the hood being formed and arranged to progressively reduce this effect when the intention is to reduce the distance at which the cotton is to be discharged.

These and other objects of the invention will become more apparent from the specification and drawings wherein:

Figure 1 is a side elevational view of the pertinent portion of a cotton harvester and trailing wagon with the novel cotton classifier and distributor associated therewith, portions of this structure being broken away in order to clarify the illustration;

Figure 2 is a fragmentary side elevational view of the cotton classifying chamber and hood construction with portions shown in vertical cross section and the hood positioned in a downwardly discharging position; and Figure 3 is a further longitudinal sectional view illustrating the hood in a rearwardly discharging position.

Describing the invention in detail, the tractor generally designated 2 is provided with the drawbar 3, which is pivotally connected to a draft member 4 as at 5, the member 4 being connected to a trailing wagon, generally indicated 6, which includes a box 7 having forward and rear ends 8 and 9, the forward end 8 underlying the upper rear end 10 of an elevator 11 of a cotton harvester of the type shown in U. S. Patents 2,677,226 or 2,654,201. The elevator 11 comprises a housing 12 having an endless conveyor 13 disposed therein and the conveyor is operated by means of a driving connection with a power shaft 14 which is operatively connected to the power take-off of the tractor as described in the aforementioned patents. The housing 12 has a bottom discharge opening 16 at its upper end through which the material is discharged downwardly.

The housing 12 supports a blower generally designated 18 therebeneath, said blower incorporating a substantially cylindrical blower chamber 19 within which is supported a vaned fan 20 which is mounted on a shaft 21 which is carried on bearings supported on the end panels 24 which close opposite ends of the fan cage 19. The panels 24 and 25 extend upwardly from the fan housing and flank opposite sides 26 and 27 of the housing and preferably weld-connected thereto and affording a support for the fan. The housing 19 is provided with a tangential air duct or nozzle 30, in the form of a rectangular pipe, which is extended upwardly and rearwardly from the fan cage to the forward end 32 of the separating or classifying chamber 33 of a guide or deflector generally indicated 34, which underlies directly beneath the discharge opening and comprises a pair of laterally spaced vertical side walls 35 and 36, which at their upper ends receive the elevator housing 12 therebetween and at their upper edges are connected as by rivets to the walls 27 and 26 respectively. The side walls 35 and 36 are interconnected at their lower edges by a transverse bottom wall 38 which slopes downwardly and forwardly to the forward open end or discharge opening 39 which is adapted to be positioned over the front end of the wagon for discharging the heavy material as shown in Figure 1.

The air duct 30 is connected at its discharge or air outlet end 40 to the bottom panel 41 of the elevator housing 12 by means of a bracket 42 and is positioned immediately above the opening 39 and projects an air stream indicated by the arrows 43 (Figure 3) between the walls 35 and 36 and intermediate the discharge outlet 16 of the elevator and bottom wall 38 of the separating chamber 33. The air stream 43 is directed to the upper open end 45 of the channel-shaped chute 34, the end 45 being relatively narrow as compared with the forward end 32 and communicating with a hood or deflector structure generally indicated 46 and in substantial alignment with the air stream 43 and which is disposed on the leeward side of the falling aggregate and comprises an arcuate top wall 47, which is in the path of the air stream 43 with its concave side 48 facing downwardly. The wall 47 extends between and is interconnected with rearward continuations or extensions 49 and 50 of the side walls 35 and 36 of the chamber structure 33. The top wall 47 of the hood extends upwardly and rearwardly from the upper end 10 of the elevator and has a rearwardly and downwardly open rear end 51 through which the lighter cotton is adapted to discharge.

The hood has a deflector, generally designated 53, telescoped thereover and said deflector has a pair of laterally spaced upright side walls 54 and 55, and disposed outwardly and flanking walls 49 and 50 of the hood 46 and the walls 54 and 55 are interconnected by an arcuate top wall or web 56, which overlies the top wall 47 of the hood. The hood 53 is pivoted beneath the hood 46 on a generally horizontal axis by means of a shaft 58 which extends through the opposite side walls 54 and 55, or the triangular panels 54 and 55, adjacent to the juncture of their bottom and forward adjacent edges 59 and 60, the pin 58 passing through the depending lugs 61 formed integral with walls 35 and 36 at the upper end of the wall 38 of the separating chamber. The deflector or hood 53 is provided with a bottom wall or web 63 which is curved upwardly and extends from the upper end of the wall 38 rearwardly in converging relation to wall 56 and in the upper position of member 53 is disposed in closing relation to the bottom portion and partially throttling the rear portion of the opening 51 of the hood 46, and it will be seen that the curvature of the wall 63 is so chosen that there is a material constriction of the opening 51 in the raised position of the hood as shown in Figure 3 whereby providing a venturi effect to accelerate the flow of the air through the constricted space in order to carry the cotton far to the rear end 9 of the wagon. However in the upper position of the distribution hood 53 the wall 63 is below the plane of wall 38. It will also be seen from a consideration of Figure 2 that when the hood 53 is positioned in its downward position to discharge downwardly, the area of the discharge opening 51 is materially increased and the volumetric dimension of the hood chamber 65 and the deflector chamber 66 is more than doubled thereby reducing the velocity of the air issuing from the discharge opening 67 of the deflector 53. This precludes blowing the air at high velocity to the portion of the wagon directly beneath the deflector and correlates the velocity to be imparted to the cotton in proportion to the distance at which it is to be projected and also reduces the possibility of smashing green bolls against the floor bottom, in the event that some of these do get through, with the consequent staining of the cotton.

It will be seen from Figure 3 that the top walls 56 and 47 are vertically or transversely spaced in the raised position of hood 53 and develop with adjacent portions of respective hoods, a longitudinal passage 56' therebetween which is open to the atmosphere at its forward end and to the chamber 66 at its rear end to supply and increase the velocity of air passing through the chamber 66 and thus provide a vehicle to sustain the light cotton in its rearward flight.

The deflector 53 is pivotally connected as at 70 at a point above the axis of pivot from the pin 58 to the upper end of the control cable 71 which at its other end is pivotally connected as at 72 to an upright lever member 73 above its axis of pivot 74 on a detent assembly bracket 75. It will be seen that the cable 71 is positioned along one side of the housing of the elevator 11 and that it is maintained taut by means of a tension spring 77 which is connected to a bracket on the bottom wall 63 of the hood 53 and a bracket 78 weld-connected to the underside and depending from the bottom wall 38 of the separating chamber 33, the spring 77 tending to continuously urge the deflector 53 downwardly.

The blower is provided with an air inlet 94 at each end through the plate 24 communicating with the cage 19. The air volume is controlled manually by positioning the valve plate 91 which is pivoted on a horizontal axis as at 92 to the related plate 24.

It will be seen that the shaft 21 of the fan 20 is driven by a belt drive train 95 which is operatively connected to the power source of the tractor 2 as will be readily understood by those skilled in the art.

What is claimed is:

1. A classifier and cleaner for use with a conveyor having a bottom discharge opening, means for directing an air stream beneath said opening transversely through the material as it issues from said opening, a chute structure positioned beneath said opening and having spaced side panels extending downwardly from said opening at opposite sides thereof and having a bottom web interconnected with said panels and inclined to the horizontal from one end to the other and defining with said side panels a classification chamber with a relatively large heavy material discharge opening at one end toward which said bottom web slopes downwardly and a relatively light material discharge opening at the other end, a deflector forming an extension of said chute and comprising a closed top and closed sides and an open bottom and a rear end remote from said chute having a discharge opening, a distributing hood disposed in telescoping relation to said deflector and pivotally supported beneath said deflector for rotation thereabout and having a bottom wall disposed in extension of said bottom web of said chute and across said open bottom of said deflector, said bottom wall of the hood having an end remote from said chute defining the lower margin of said discharge opening of said deflector, and means for swinging said hood vertically whereby said bottom wall is moved toward said top of said deflector to face said discharge opening rearwardly and to simultaneously decrease the area of said discharge opening of said deflector and thereby increase the velocity of the air stream with the entrained light material to blow said light material at high acceleration distantly rearwardly, and said means adapted to move said hood downwardly whereby said bottom wall is moved away from the top of the deflector to face said discharge opening downwardly and to coincidentally increase the area of said discharge opening of the deflector and thereby decrease the velocity of the air stream with the entrained light material to blow said light material with minimum acceleration downwardly.

2. The combination according to claim 1 and said deflector further incorporating a pair of side walls disposed alongside respective sides of said chute and having a top web interconnecting said side walls of the deflector and overlying said closed top of said hood and having a discharge opening in registry with said open end of said hood and said deflector providing a variable discharge chamber attendant to pivoting said deflector and said top web spaced vertically from said top of said hood and having a curvature whereby in maximum downward extension of said deflector relative to said hood said top web engages said top of said hood.

3. A cotton cleaner and distributor for use with an upwardly directed cotton harvester elevator having a cotton discharge outlet opening downwardly and rearwardly for discharging downwardly and rearwardly of the elevator, a stream of cotton comprising seed cotton, green cotton bolls and foreign matter, said cleaner and distributor comprising a channel-shaped separating chute supported from said elevator below said outlet and having a bottom wall inclined downwardly and forwardly and having a forward open end and a rearward open end, means for passing a stream of air through said chute comprising an air duct having an air outlet at said forward end of said chute and directed upwardly and rearwardly and transversely of the stream of cotton issuing from the elevator discharge outlet, a deflector carried at the upper end of said elevator over said rearward end of said chute in the path of the air stream flowing from said air outlet, said deflector having a closed top and closed sides and an open bottom and rearward end, a tubular distribution hood having top and bottom walls positioned respectively over said top side of the deflector and beneath said open bottom thereof in enclosing relation thereto, said bottom wall extending rearwardly from the adjacent end of said bottom wall of said chute, and said top wall of said hood spaced vertically from said top side of said deflector in at least certain positions of the hood and said hood having its side and top walls defining in said certain positions of the hood a passage with said top side of said deflector open at one end to the atmosphere and at its other end to said hood.

4. In a material classifier for use with an elevator of a harvester having an elongated diagonally disposed housing with an upper end provided with a discharge opening in its underside through which elevated material may fall, a blower mounted on the elevator and having an air discharge nozzle arranged to direct a blast of air directly under said discharge opening so as to pass through the material discharged therefrom, an inclined channel shaped receiving chute disposed below said opening in longitudinal alignment with said nozzle and having a first open end below said nozzle for discharging heavy material and having a second discharge end remote from said nozzle for discharging light material, a deflector including a wall member extending outwardly from said upper end of said elevator and over said second open end of said chute in the path of the air stream passing through said chute for deflecting said lighter material outwardly, and a distributing hood having interconnected spaced top and bottom walls and upright laterally spaced side walls, said bottom wall extending outwardly from the bottom of said chute beneath and in spaced relation to said wall member of said deflector and defining a discharge opening therewith and said side walls disposed at opposite sides of said member and said top wall overlying said member, and means pivotally supporting said hood at a point below said wall member for vertical swinging movement whereby said hood is pivotal upwardly to discharge said material generally horizontally with concomitant movement of said bottom wall upwardly and constricting said discharge opening to increase the velocity of the air moving therethrough and pivoting said hood downwardly for discharging the material downwardly and enlarging said discharge opening to reduce the velocity of the air passing therethrough.

5. The invention according to claim 4 and said top wall of said hood and said wall member of said deflector spaced vertically and with adjacent portions of said side walls of the hood defining an air passage therebetween in positions other than the lowered position of the hood, and said top wall having a curvature intersecting the top of said wall member adjacent to its rear end in the downward position of said hood whereby said top wall of the hood abuts said wall member and closes said air passage therebetween.

6. In an elevator for a harvester, an upwardly and outwardly inclined housing having a discharge opening in the upper end portion of its inclined lower side, means within the housing for elevating material from the implement and discharging the material outwardly and downwardly through the opening, a channel-shaped chute mounted under said housing beneath said discharge opening and having inner and outer open ends, means for directing a blast of air upwardly and outwardly under said discharge opening through said chute from said inner to said outer end as the material issues from said discharge opening into said chute, a deflector mounted on said upper end portion of the housing and including a wall extending outwardly from the housing above said chute and over its outer end in the path of the air stream issuing therefrom to deflect outwardly the material carried by said air stream, and a distribution hood telescoped over said deflector and having a lower part underlying said wall of said deflector, said lower part having an inner end pivoted on a generally horizontal axis beneath said chute vertically whereby said hood is swingable upwardly to an upper position thereof and to position said bottom portion of the hood close to said wall of the deflector to provide a constricted discharge opening and said hood swingable downwardly to direct the material downwardly with coincident movement of said lower portion of said hood away from said wall of the deflector to provide an enlarged discharge opening.

7. The invention according to claim 6 and further characterized in that said chute comprises a pair of upright side walls and a bottom wall interconnecting the side walls, and said deflector comprising sides formed as upward and outward continuations of said side walls and connected to opposite margins of said wall of said deflector and extending downwardly therefrom and forming a discharge chamber portion and said hood having spaced sides and a closed top and bottom defining a further portion of said discharge chamber and said hood when swung downwardly extending from said deflector and enlarging said discharge chamber and said hood when swung upwardly telescoping over said hood and thereby reducing said discharge chamber.

8. A cotton cleaner and distributor for use in conjunction with a cotton harvester having an upwardly directed cotton elevator housing with an upwardly directed cotton conveyor therein and an upper end portion with a cotton discharge opening facing downwardly and rearwardly of the housing for discharging downwardly and rearwardly of the elevator a stream of cotton comprising mature cotton, immature cotton and foreign matter; said cleaner and distributor including: a channel-shaped chute disposed beneath said opening and having a pair of upright walls flanking and connected to opposite sides of said housing and having a bottom wall interconnected between and with said upright walls defining a material classification chamber, said chute having inner and outer open ends and said bottom wall inclining downwardly toward said inner end whereby said area of the opening of said inner end is larger than that of said outer end; a blower mounted on the elevator and having an air duct extending into the inner end of said chute and arranged to direct a blast of air longitudinally of the housing through said classification chamber; a deflector comprising side portions formed as extensions of said upright side walls of said chute and further comprising a top wall extending outwardly from the upper end portion of the housing and interconnecting said side portions, said top wall curved outwardly and downwardly and positioned in the path of the air stream issuing from said outer end of the chute for directing outwardly said air stream and the material entrained therein; a distributing hood telescoped over said deflector and comprising a pair of upright side panels disposed outwardly of and alongside respective side portions of the deflector, means hingedly connecting said side panels at their lower extremities to the bottom of said deflector at said outer open end thereof to accommodate vertical swinging movement of the hood, a bottom web interconnecting said side panels of the hood and extending outwardly from the adjacent end of the bottom wall of said chute, and a top web interconnecting said side panels and overlying said top wall and with said panels and bottom web defining a tubular hood, said hood movable upwardly whereby said bottom web thereof is pivoted upwardly and providing a constricted outlet for the deflector with its top wall, said hood pivotal downwardly with attendant movement of said bottom web pivotal downwardly away from said top wall to enlarge said opening to discharge the material downwardly.

9. The invention according to claim 8 and said bottom web convexed upwardly and disposed in the upper position of said hood below the plane of said bottom wall of said chute.

10. The invention according to claim 9 and said top web having a curvature spacing it vertically above said top wall of the deflector in the upper position of the hood and closing said space in the lower position of the hood.

11. The invention according to claim 8 and said top wall of the deflector and the top web of said hood spaced vertically in the upper position of the hood and said top web having a trailing portion developed with a curvature intersecting the curvature of said top web in the lowered position of the hood and in abutment with each other.

12. A cotton classifier and cleaner for association with a cotton harvester having an upwardly directed cotton elevator having a housing with an elevated discharge opening facing downwardly and rearwardly of the housing for discharging downwardly and rearwardly of the elevator a stream of cotton comprising mature cotton, immature cotton and foreign matter, said cleaner and distributor including, an air nozzle, means for blowing a stream of air through said nozzle, said nozzle having an air outlet directed upwardly and rearwardly and transversely of the stream of cotton falling from the elevator discharge opening, a classification chute carried by the housing beneath said opening and extending from said nozzle upwardly and rearwardly therefrom and having an inner open end beneath said nozzle for discharging the immature cotton and heavy foreign matter, said chute terminating in an upper end incorporating a deflector which includes a top wall extending rearwardly from the upper end of the elevator housing and further having closed sides defining a portion of a discharge chamber, and a tubular distributing hood pivotally supported to swing relative to said deflector in telescoping relation thereto and in extension thereof and providing another discharge chamber portion which is additive to said first mentioned chamber portion to enlarge the same when said hood is in extended position relative to said deflector, said hood having walls converging toward an outer end thereof and providing a narrowing discharge opening in a direction away from said deflector and said hood and deflector having certain opposed portion spaced transversely from each other and formed and arranged to develop an air passage lengthwise of the hood open to the atmosphere at one end and to said discharge opening at the other end.

13. In a material classifier of the type including structure having a bottom discharge opening for discharging a mixed aggregate of light and heavy material downwardly therethrough and means including an air nozzle disposed to blow a stream of air across the path of the falling aggregate for entraining the light material therein, a guide deflector assembly disposed in general alignment with said stream of air on the leeward side of the falling aggregate for receiving said light material and including a wall extending generally lengthwise of the air stream from said discharge bottom opening of said structure, and a hood having closed sides and open ends one of which is directed toward the nozzle and the other having a discharge opening remote from the nozzle, said hood telescoped over said wall and said wall and an opposing side of said hood spaced transversely of each other and defining an air passage open at one end to the atmosphere and at the other end to said hood adjacent to said discharge opening for supplying additional air into the hood at said discharge opening thereof in consequence of said stream of air passing through said hood to collectively therewith provide a sufficient body of air for carrying said light material distantly out of said hood, said hood including a bottom positioned to move close to said wall for constricting the discharge opening for increasing the air velocity as said light material is being distantly blown.

References Cited in the file of this patent

UNITED STATES PATENTS

| | | |
|---|---|---|
| 845,876 | Luke | Mar. 5, 1907 |
| 1,962,668 | Olney | June 12, 1934 |
| 2,257,097 | Anderson et al. | Sept. 30, 1941 |
| 2,645,821 | Fowler | July 21, 1953 |